United States Patent [19]
Frantz et al.

[11] Patent Number: 5,180,188
[45] Date of Patent: Jan. 19, 1993

[54] INFLATION GAS FLOW DIRECTING MEMBER FOR AIR BAG SYSTEM

[75] Inventors: Brian H. Frantz, Royal Oak; Jack L. Jensen, Highland; Gregory A. Miller, Troy, all of Mich.

[73] Assignee: General Motors Corporation, Detroit, Mich.

[21] Appl. No.: 752,135

[22] Filed: Aug. 29, 1991

[51] Int. Cl.⁵ .............................................. B60R 21/26
[52] U.S. Cl. ........................................ 280/740; 280/743
[58] Field of Search ............... 280/728, 729, 743, 736, 280/742, 731, 730, 732, 740

[56] References Cited

U.S. PATENT DOCUMENTS

| | | | |
|---|---|---|---|
| 3,752,501 | 8/1973 | Daniel et al. | 280/729 |
| 3,799,576 | 3/1974 | Fiala | 280/732 |
| 5,009,452 | 4/1991 | Miller | 290/731 |

FOREIGN PATENT DOCUMENTS

| | | | |
|---|---|---|---|
| 2152635 | 4/1973 | Fed. Rep. of Germany | 280/729 |
| 311930 | 12/1989 | Japan | 280/729 |
| 136943 | 6/1991 | Japan | 280/728 |
| 136945 | 6/1991 | Japan | 280/728 |

*Primary Examiner*—Karin L. Tyson
*Attorney, Agent, or Firm*—Charles E. Leahy

[57] ABSTRACT

An occupant restraint system includes a folded cushion having an upper wall portion and a reaction member which is pocketed or sealed against the upper wall portion by a sheet of flexible material having an inner portion covering the reaction member and an outer peripheral portion which is secured to the upper wall portion. The reaction member is mounted to the support of the system by a flexible strap and has a sharpened edge. During a subsequent stage of deployment of the cushion, the sharpened edge of the reaction member severs the peripheral portion of the sheet of flexible material from the inner portion thereof so that the peripheral portion and the upper wall of the cushion can move normal to or toward the occupant.

6 Claims, 3 Drawing Sheets

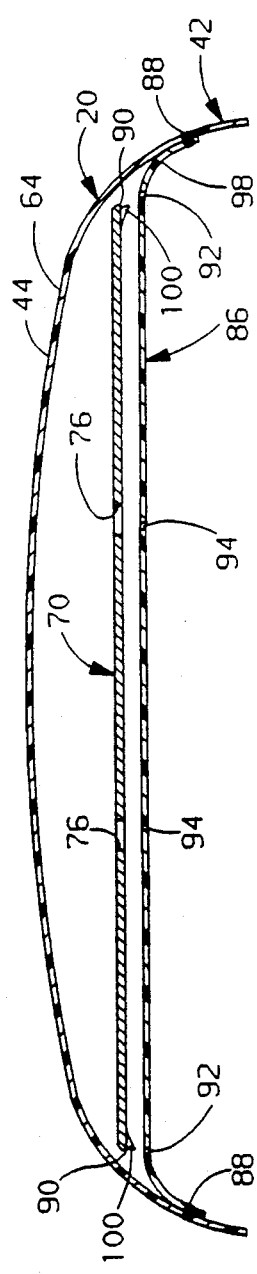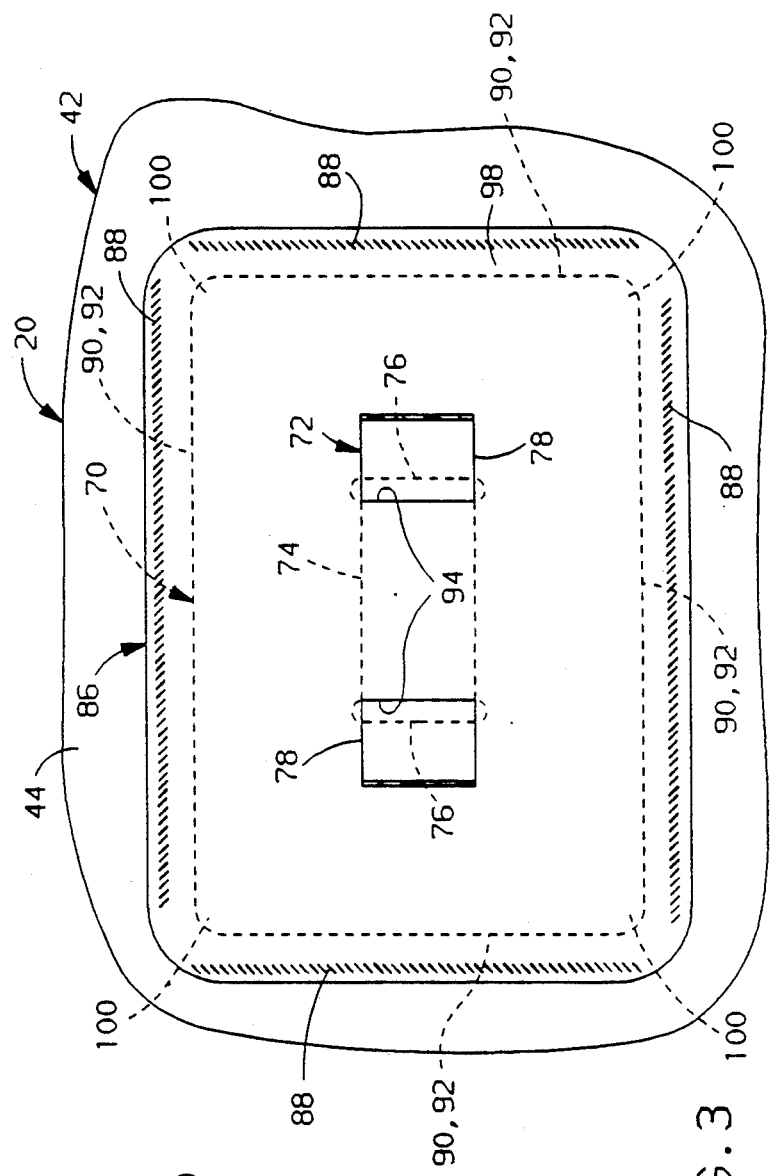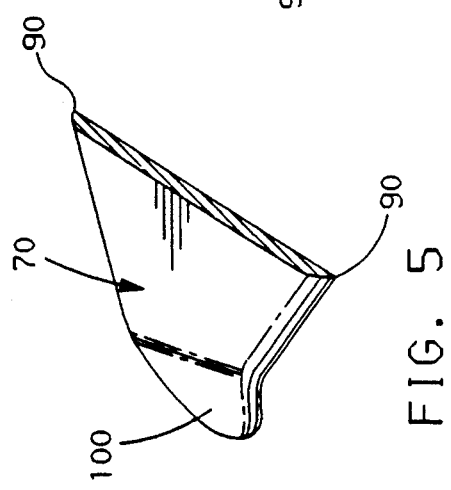

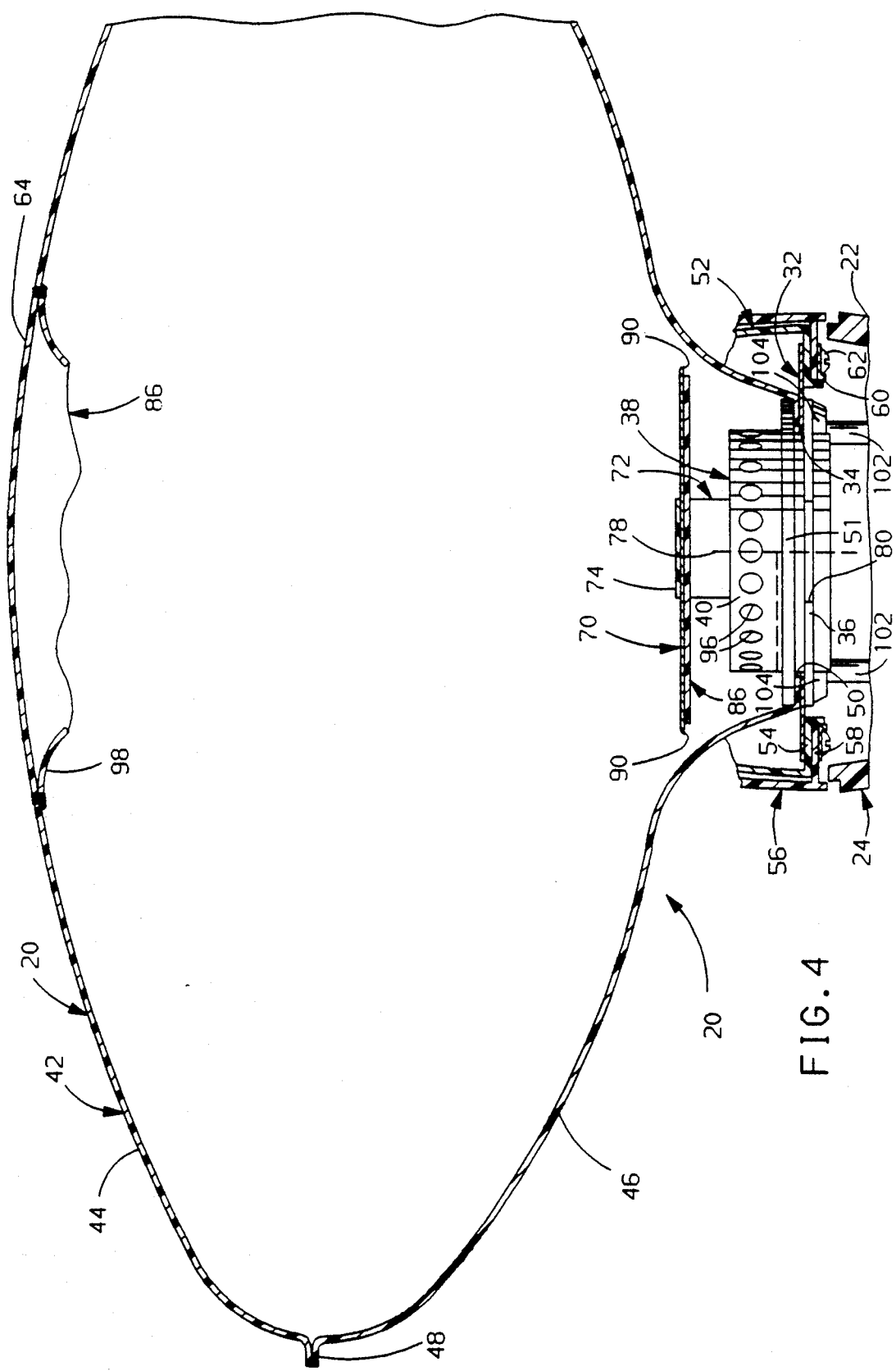

INFLATION GAS FLOW DIRECTING MEMBER FOR AIR BAG SYSTEM

BACKGROUND OF THE INVENTION

This invention relates to occupant restraint systems and more particularly to occupant restraint systems of the type which releasably secure the cushion against initial deployment normal to or toward the occupant and direct such initial deployment laterally of the occupant.

U.S. Pat. No. 5,009,452, Occupant Restraint System, issued Apr. 23, 1991 to Gregory A. Miller and assigned to the assignee of this invention, discloses an occupant restraint system which includes a reaction member mounted to the support of the restraint module and located above the inflator of an occupant restraint system. The reaction member is sealed to the upper wall portion of the occupant restraint cushion to prevent the impingement of pressure fluid from the inflator against such upper wall portion during initial deployment of the cushion and thereby restrict such initial deployment laterally of the occupant through the unfolding of the folded side and end walls of the cushion.

Copending application Ser. No. 07/752,133, Occupant Restraint System, Filed Aug. 29, 1991, Frantz et al. and assigned to the assignee of this invention, discloses a reaction member type system wherein the reaction member is mounted to the support by a flexible strap or mounting member which is looped through the reaction member and has the legs thereof secured to the support of the system. The reaction member is pocketed to the inside of the upper wall of the cushion by flaps of flexible material. In one embodiment, the flaps are individual and secured to the inside of the upper wall of the cushion. The flaps overlap each other and are sandwiched to the reaction member by a retainer member which is secured to the reaction member. In another embodiment, the flaps are part of sheet of flexible material which is provided with diagonal tear lines to separate into flaps.

The occupant restraint system of this invention is also of the type which includes a reaction member mounted to the support by a flexible strap or mounting member. However, it includes an alternate manner of sealing the interface between the reaction member and the upper wall of the occupant restraint cushion. In the preferred embodiment, a sheet of flexible material such as Tyvek, covers the reaction member and has the periphery or edge portion thereof sewn or otherwise secured to the inside of the upper wall of the folded cushion so as to seal the interface between the periphery of the reaction member and the upper wall of the cushion. The sheet of flexible material is directly secured to the reaction member in any suitable manner, such as by adhesive, and no retainer member is necessary.

The edge of the reaction member is sharpened. In one embodiment of this invention, the sheet of flexible material is perforated along a line aligned with the sharpened periphery along a line aligned with the sharpened periphery or edge of the reaction member. The sharpened edge of the reaction member cuts through the sheet of flexible material along the perforated line when the upper wall of the cushion, with the sheet of flexible material, moves away from the reaction member and normal to or toward the occupant. In another embodiment, the sheet of flexible material is not perforated, and the corners of the reaction member are arranged to initiate the cutting of the sheet of flexible material prior to the edges of the reaction member cutting the sheet of flexible material.

The primary feature of this invention is to provide an occupant restraint system which includes a reaction member mounted to a support and releasably sealed to the inside of the upper wall of the cushion during initial deployment of the cushion by a sheet of flexible material having the periphery thereof covering the periphery of the reaction member and the edge portion thereof secured to the upper wall of the cushion, with the periphery of the sheet of flexible matering being cut of severed from the remainder thereof by the reaction member and moving with the upper wall of the cushion normal to or toward the occupant during subsequent deployment of the cushion. Another feature is that the reaction member is provided with a sharpened edge to sever the periphery of the sheet of flexible material from the remainder thereof. A further feature is that the sheet of flexible material may be perforated along a line aligned with the sharpened edge of the reaction member. Yet another feature is that the corner portions of the sharpened edge of the reaction member are arranged to initiate cutting of the sheet of flexible material.

These and other features of this invention will be readily apparent from the following specification and drawing wherein:

FIG. 2 is an enlarged view of a portion of FIG. 1.

FIG. 3 is a view taken along line 3—3 of FIG. 1;

FIG. 4 is a view similar to FIG. 1 with the occupant restraint cushion fully deployed; and, FIG. 5 is a perspective view showing an alternative embodiment.

Figure 1:
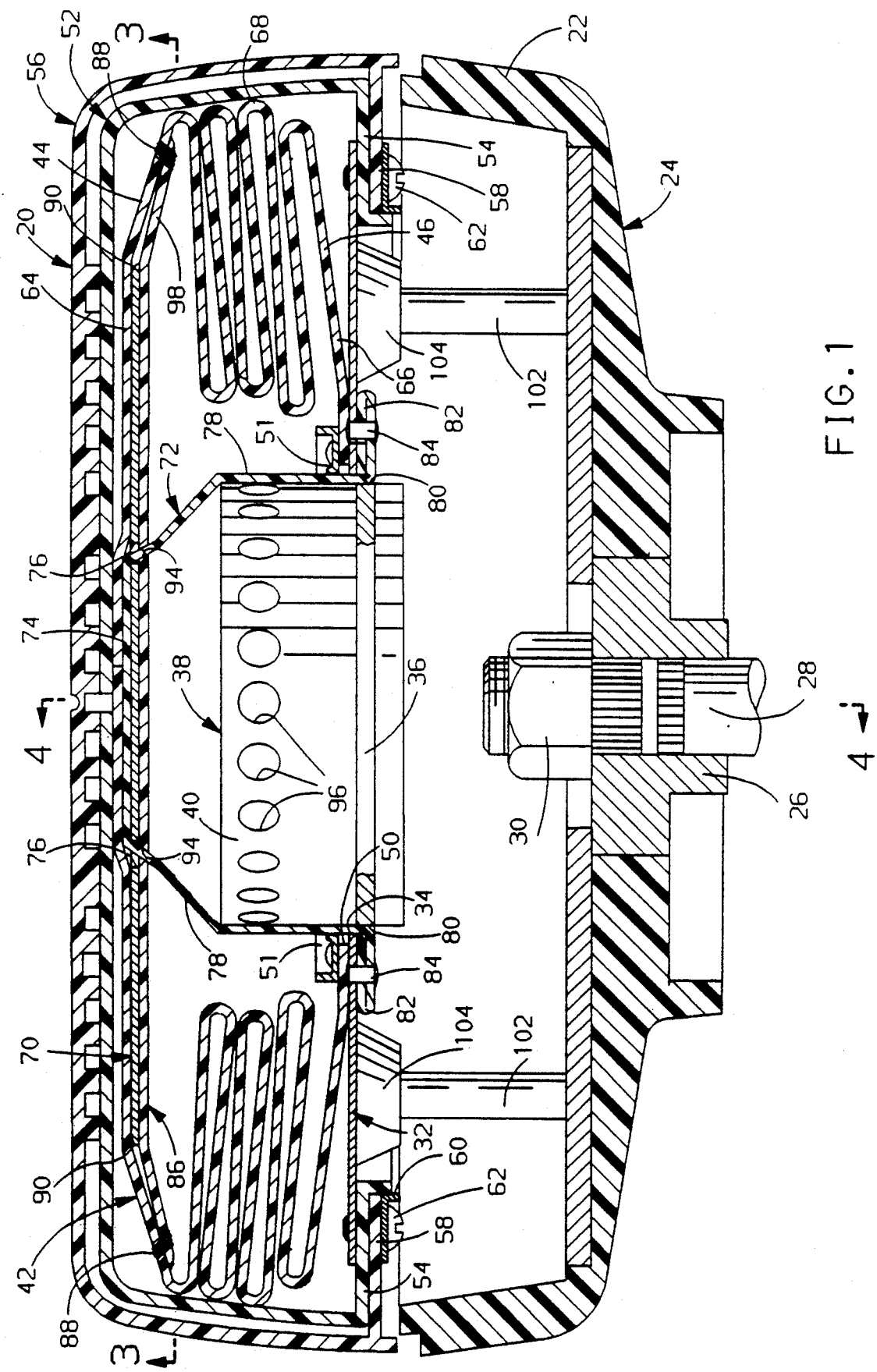
FIG. 1 is a sectional view of an occupant restraint system according to this invention.

Referring now to FIG. 1 of the drawings, an occupant restraint system 20 according to this invention is shown mounted to the hub portion 22 of a vehicle steering wheel 24. The hub portion includes a splined bushing 26 which receives the splined upper end of the vehicle steering shaft 28 and is secured thereto at 30 to secure the vehicle steering wheel 24 to the vehicle steering system.

A generally rectangularly shaped plate or support 32 has a central circular opening 34. The flange 36 of a conventional inflator 38 underlies the support 32 around the opening 34. The outlet portion 40 of the inflator projects within the interior of the folded occupant restraint cushion 42. The cushion 42 includes upper and lower or forward and rearward circular members 44 and 46 which are secured together at their circular edge portions 48, FIG. 4. The upper or forward cushion member 44 provides the impact surface engaged by the driven when the cushion is inflated. The lower or rearward cushion member 46 has a central opening 50, the edge portion of which is located underneath a retainer 51. Spaced fasteners secure the flange 36, the edge portion of the opening 50, and retainer 51 to the support 32 as shown in the Frantz et al. application Ser. No. 07/752,133.

The inflator 38 is a conventional gas generator which is actuated to produce gas or pressure fluid when a suitable sensor, either acceleration or velocity or otherwise, senses an actual or impending impact of the vehicle with an obstacle and sends an appropriate signal to the inflator.

A container 52 for the cushion 42 is formed of plastic material and has a generally box-like rectangular shape. The container houses the folded occupant restraint cushion 42 and has a segmented flange 54 which underlies the support 32. An outer decorative cover 56 of plastic material is of the same general shape as the container 52. The cover 56 has a segmented flange 58 which overlies the flange 54 of the container. A retainer 60 overlies the flanges 54 and 58 and is secured at 62 to the support 32 to secure the container and cover to the support 32.

The cover 56 and container 52 have respective molded in lines and molded in perforations so as to separate in pairs of flaps during deployment of the cushion. Reference may be had to U.S. Pat. No. 4,903,986 Cok et al., Occupant Restraint System, issued Feb. 27, 1990 for the details of the cover and container as well as the manner in which the members 44 and 46 of the cushion 42 are folded to provide a generally rectangularly shaped upper wall portion 64, a lower wall portion 66, fan folded side wall portions, not shown, and pleat folded end wall portions 68, FIG. 1.

A generally rectangularly shaped reaction plate or member 70 is of the general size of the upper wall portion 64 and seats thereagainst. A flexible member of strap 72 has its bight 74 looped through a pair of slots or openings 76 in the reaction member 70. The legs 78 of the strap 72 pass around the inflator 38, through the retainer 51, through the opening 34 in the support 32 and through diametrically opposed slot segments 80 of the flange 36, to the underside of the support 32. The ends of the legs are doubled over at 82 and riveted or otherwise secured at 84 to the underside of the support 32 adjacent the opening 34 therethrough.

As shown in FIGS. 1, 2 and 3, a sheet of flexible material 86, such as Tyvek, or the material of the cushion 42, is of rectangular shape and larger than the reaction member 70. The sheet of flexible material 86 has a main or inner portion covering the reaction member 70 and an outer or peripheral portion located outwardly of the edge of the reaction member 70 and sewn or otherwise secured at 88 to the inside of the upper wall 44 of the cushion 42. The sheet of flexible material 86 pockets the reaction member 70 to the upper wall 44 of the cushion 42 and seals the interface between the edge of the reaction member and the upper wall 44 against the entry of pressure fluid therebetween. As indicated in FIG. 2, the edge of the reaction member is sharpened at 90 and the sheet of flexible material is provided with a line of perforations or slits 92 which are generally aligned with the sharpened edge 90 of the reaction member 70. The sheet of flexible material seals the interface between the reaction member 70 and the inside of the upper wall 44 of the cushion against the entry of pressure fluid. Slots or openings 94 in the main or inner portion of the sheet of flexible material 86 permit passage of the legs 78 of the strap 72 therethrough.

When the inflator 38 receives an appropriate signal, the inflator generates gas or pressure fluid which exits into the interior of the folded cushion 42 through the upper outlet ports 96 of the inflator 38. The pressure fluid initiates unfolding of the fan folded side wall portions and pleat folded end wall portions 68 of the cushion 42 through the separable flaps in the longer or 6 and 12 o'clock side walls and shorter or 3 and 9 o'clock side walls of the container 52 and cover 56 to initiate deployment of the cushion 42 laterally of the occupant, as set forth in the aforenoted Cok et al. patent. During this initial deployment of the cushion 42, the upper wall portion 64 of the cushion 42 remains generally stationary since the sheet of flexible material 86 seals the interface between the periphery of the reaction member 70 and such upper wall portion so that the pressure fluid cannot enter through such interface and impinge against the upper wall portion 64. Thus, the upper or forward wall 44 of the cushion does not initially deploy toward the occupant.

As the volume and pressure of the pressure fluid increase, the side wall portions 68 and end wall portions of the cushion continue to unfold into continuations of the sealed upper wall portion 46 of the cushion 42. When such side and end wall portions are substantially unfolded, the pressure fluid forces the wall 44 toward the occupant to force the peripheral portion of the sheet of flexible material 86 against the sharpened edge 90 of the reaction member 70 to sever the peripheral portion 98 of sheet 86 from the main or inner portion thereof so that the peripheral portion 98 and forward or upper wall 44 of the cushion can move normal to or toward the occupant, as shown in FIG. 4, subsequent to the initial deployment laterally of the occupant.

The main or inner portion of the sheet of flexible material 86 may be secured, such as by adhesive, to the reaction member 70 to ensure that this portion of the sheet of flexible material does not come into contact with the upper outlet portion 40 of the inflator 38 when the inflator has ceased to generate pressure fluid.

In another embodiment of the invention, the sheet of flexible material 86 is not provided with the line of perforations or slits 92 and the corner portions 100 of the reaction member 70 can be slightly offset downwardly, or toward the inflator 38, as shown in FIG. 5, to initiate severing of the peripheral portion 98 of the sheet of flexible material 86 from the main or inner portion thereof.

The support 32, inflator 38, cushion 42, container 52, cover 56, reaction member 70, strap 72 and sheet of flexible material 86 are assembled together to provide a self-contained restraint system module.

The module is assembled in overlying relationship to the opening of the hub portion 22 of the steering wheel by fasteners, not shown, which extend upwardly through openings in the hub portion 22 and into tapped cylindrical tubes or struts 102 which are secured to downward embossments 104 of support 32.

In order to further ensure that none of the pressure fluid enters the space between the reaction member 70 and the upper wall portion 46 of the cushion 42, the openings 88 in the sheet of flexible material 86 can be sealed to the legs 78 of the strap 72 passing therethrough. The perforations or slits 92 are so small that they do not present any sealing problem.

The strap 72 can be formed of a multiple folded over piece of material, such as the material of the cushion 42. Further, the portions of the legs 78 of the strap 72 which pass near the outlets 92 of the inflator 38 can be appropriately coated, such as with a silicone base material, to prevent deterioration of their strength.

Thus, this invention provides an occupant restraint system of the type shown in the aforenoted Miller patent in order to provide for initial deployment of an occupant restraint cushion laterally of an occupant and delayed deployment of the cushion normal to or toward the occupant.

The embodiments of the invention in which an exclusive property or privilege is claimed are defined as follows:

1. An occupant restraint system comprising, support means, an inflatable occupant restraint cushion mounted to the support means and including an upper wall portion spaced from the support means, a source of pressure fluid for inflating and deploying the cushion, a pressure fluid reaction member covering the inside of the upper wall portion of the cushion, means mounting the reaction member to the support means in overlying relationship to the source of pressure fluid, a sheet of flexible material having an inner portion covering the reaction member and an outer portion secured to the inside of the upper wall portion of the cushion, the sheet of flexible material pocketing the reaction member to the inside of the upper wall portion of the cushion to seal the interface between the reaction member and such upper wall portion during the initial stage of deployment of the cushion, and means associated with the reaction member severing the outer portion of the sheet of flexible material from the inner portion thereof during a subsequent stage of deployment of the cushion to permit such outer portion to move with the cushion toward the occupant.

2. An occupant restraint system comprising, support means, an inflatable occupant restraint cushion mounted to the support means and including an upper wall portion spaced from the support means, a source of pressure fluid for inflating and deploying the cushion, a pressure fluid reaction member covering the inside of the upper wall portion of the cushion, means mounting the reaction member to the support means in overlying relationship to the source of pressure fluid, a sheet of flexible material covering the reaction member and having an outer edge portion secured to the inside of the upper wall portion of the cushion adjacent to and outwardly of the edge portion of the reaction member, the sheet of flexible material pocketing the reaction member to the inside of the upper wall portion of the cushion to seal the interface between the edge portion of the reaction member and such upper wall portion during the initial stage of deployment of the cushion, and means on the reaction member severing the sheet of flexible material from the reaction member during a subsequent stage of deployment of the cushion to permit the upper wall portion of the cushion to move toward the occupant.

3. An occupant restraint system comprising, support means, an inflatable occupant restraint cushion mounted to the support means and including an upper wall portion spaced from the support means, a source of pressure fluid for inflating and deploying the cushion, a pressure fluid reaction member covering the inside of the upper wall portion of cushion, means mounting the reaction member to the support means in overlying relationship to the source of pressure fluid, a sheet of flexible material covering the reaction member and having the outer edge portion thereof secured to the inside of the upper wall portion of the cushion adjacent the edge of the reaction member, the sheet of flexible material pocketing the reaction member to the inside of the upper wall portion of the cushion to seal the interface between the reaction member and such upper wall portion during the initial stage of deployment of the cushion, and means on the edge portion of the reaction member severing the reaction member from the sheet of flexible material during a subsequent stage of deployment of the cushion to permit the upper wall portion of the cushion to move toward the occupant.

4. An occupant restraint system comprising, support means, an inflatable occupant restraint cushion mounted to the support means and including an upper wall portion spaced from the support means, support means, a source of pressure fluid for inflating and deploying the cushion, a pressure fluid reaction member covering the inside of the upper wall portion of the cushion and including a sharpened edge portion, means mounting the reaction member to the support means in overlying relationship to the source of pressure fluid, and a sheet of flexible material covering the reaction member and having the outer edge portion thereof secured to the inside of the upper wall portion of the cushion, the sheet of flexible material pocketing the reaction member to the inside of the upper wall portion of the cushion to seal the interface between the edge portion of the reaction member and such upper wall portion during the initial stage of deployment of the cushion, the sharpened edge portion of the reaction member severing the sheet of flexible material from the reaction member during a subsequent stage of deployment of the cushion to permit the upper wall portion of the cushion to move toward the occupant.

5. The combination recited in claim 4 wherein the sharpened edge of the reaction member includes corner portions having sharpened areas and being downwardly offset toward the inflator for severing the sheet of flexible material prior to the edge portions severing the sheet of flexible material.

6. The combination recited in claim 4 wherein the sheet of flexible material is secured to the reaction member.

* * * * *